(12) United States Patent
Bertrand et al.

(10) Patent No.: US 10,341,878 B2
(45) Date of Patent: Jul. 2, 2019

(54) CONNECTION TECHNOLOGY-BASED WIRELESS COVERAGE VERIFICATION

(71) Applicant: T-Mobile USA, Inc., Bellevue, WA (US)

(72) Inventors: Hughes Bertrand, Renton, WA (US); Karen Olcott, Bellevue, WA (US); Randy Meyerson, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/069,657

(22) Filed: Mar. 14, 2016

(65) Prior Publication Data

US 2016/0277939 A1 Sep. 22, 2016

Related U.S. Application Data

(60) Provisional application No. 62/134,377, filed on Mar. 17, 2015.

(51) Int. Cl.
*H04W 16/18* (2009.01)
*H04W 24/08* (2009.01)
*H04L 12/24* (2006.01)

(52) U.S. Cl.
CPC ............ *H04W 16/18* (2013.01); *H04L 41/12* (2013.01); *H04L 41/22* (2013.01); *H04W 24/08* (2013.01)

(58) Field of Classification Search
CPC ....... H04W 16/18; H04W 8/08; H04W 8/205; H04W 24/08; H04L 41/22; H04L 43/045; H04L 41/12
See application file for complete search history.

(56) References Cited

U.S. PATENT DOCUMENTS

| 7,574,202 B1 * | 8/2009 | Tsao | H04L 63/0272 370/310 |
| 7,929,974 B1 * | 4/2011 | Walters | H04W 28/16 370/395.4 |

(Continued)

FOREIGN PATENT DOCUMENTS

| WO | WO2011022701 A1 | 2/2011 |
| WO | WO2012048383 A1 | 4/2012 |

OTHER PUBLICATIONS

PCT Search Report and Written Opinion dated Jun. 23, 2016 for PCT application No. PCT/US2016/022496, 9 pages.

(Continued)

*Primary Examiner* — Dinh Nguyen
(74) *Attorney, Agent, or Firm* — Lee & Hayes, P.C.

(57) ABSTRACT

Verifying coverage based at least in part on crowd-sourced data associated with devices that are communicatively coupled to a service provider via a network is described. Techniques described herein include determining coverage data associated with a plurality of areas corresponding to a geographical location. In an example, the coverage data can indicate whether coverage associated with each area of the plurality of areas is verified coverage such that individual devices of a plurality of devices have successfully connected to a service provider above a threshold number of times in each area. Additionally, the techniques described herein include generating a user interface to graphically represent the coverage in the geographical location via a coverage map including a plurality of tiles respectively corresponding to the plurality of areas, each tile of the plurality of tiles being associated with a presentation indicating whether coverage associated with a corresponding area is verified coverage.

20 Claims, 5 Drawing Sheets

(56) References Cited

U.S. PATENT DOCUMENTS

| | | | |
|---|---|---|---|
| 8,996,074 B1* | 3/2015 | Oroskar | H04W 4/06 455/458 |
| 2002/0115447 A1* | 8/2002 | Martin | G06Q 20/202 455/456.3 |
| 2003/0013459 A1 | 1/2003 | Rankin et al. | |
| 2003/0027522 A1* | 2/2003 | Valdivia | H04B 7/18586 455/12.1 |
| 2006/0135180 A1* | 6/2006 | Jakel | H04W 48/16 455/456.5 |
| 2007/0060150 A1* | 3/2007 | Hart | H04W 16/32 455/446 |
| 2007/0104166 A1 | 5/2007 | Rahman et al. | |
| 2007/0207815 A1* | 9/2007 | Alfano | H04W 48/04 455/456.1 |
| 2010/0085895 A1 | 4/2010 | Bajko | |
| 2013/0005297 A1* | 1/2013 | Sanders | G01S 13/765 455/406 |
| 2013/0295962 A1* | 11/2013 | Manroa | H04W 4/02 455/456.3 |
| 2014/0057626 A1* | 2/2014 | Uelk | H04W 24/00 455/423 |
| 2014/0128057 A1* | 5/2014 | Siomina | H04J 3/0685 455/423 |
| 2014/0243026 A1* | 8/2014 | Essigmann | H04W 68/02 455/458 |
| 2014/0323119 A1 | 10/2014 | Bader | |
| 2015/0004999 A1 | 1/2015 | Schuler et al. | |
| 2015/0230109 A1* | 8/2015 | Socaciu | H04W 64/00 455/418 |

OTHER PUBLICATIONS

3rd Generation Partnership Project; Technical Specification Group Radio Access Network; "Study on Minimization of drive-tests in Next Generation Networks; (Release 9)", 3GPP Standard;3rd Generation Partnership Project, Mobile Competence Centre, Dec. 21, 2009, retrieved from: URL:http://www.3gpp.org/ftp/Specs/2014-12/Rel-9/36 series!, 24 pages.

The Extended European Search Report dated Oct. 9, 2018, for European Application No. 16765599.2, 9 pages.

* cited by examiner

CONNECTION TECHNOLOGY-BASED WIRELESS COVERAGE VERIFICATION

RELATED APPLICATIONS

This application claims priority to U.S. Provisional Patent Application No. 62/134,377, filed on Mar. 17, 2015, entitled "Connection Technology-based Wireless Coverage Verification," the entire contents of which are incorporated herein in their entirety.

BACKGROUND

Telecommunications service providers (e.g., T-MOBILE®, VERIZON®, AT&T®, SPRINT®, etc.) generate coverage maps to identify areas of service provided via communication transmitting stations. A coverage map can indicate a quality of reception of service (i.e., coverage), often measured in signal strength, in particular areas and/or can identify areas within which users can expect to obtain quality reception of service. In some examples, graphical representations of the coverage maps can be provided to users for identifying the quality of reception to be expected by a particular telecommunications service provider in a particular geographical area.

Traditionally, coverage is based on engineering estimates. That is, current techniques for determining data for coverage maps leverage models to predict where a user can expect quality reception of service. The models can consider factors such as frequencies of signals, power of signals, proximities to towers (i.e., communication transmitting stations), topography, etc. in predicting whether a user can expect quality reception of service in a particular area. However, the current techniques do not take into account various factors, such as buildings or trees, that can block signals and affect the quality of reception when users are using the telecommunication service. That is, current techniques do not represent real world conditions and accordingly, provide less than accurate coverage information.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
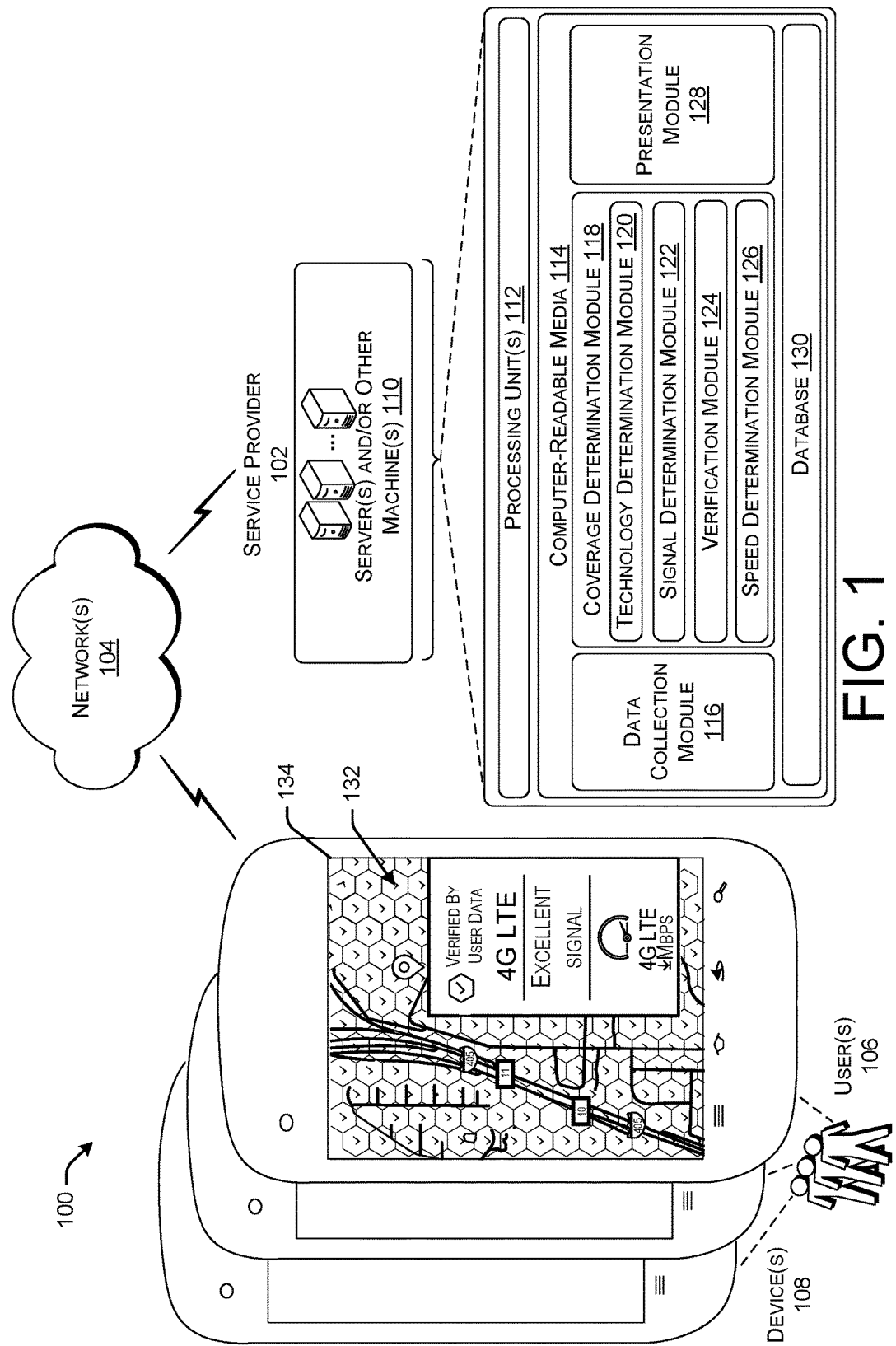
FIG. 1 is a schematic diagram illustrating an example environment for verifying coverage using data associated with devices communicatively coupled to a service provider.

This disclosure describes, in part, techniques for verifying coverage based at least in part on data associated with devices that are communicatively coupled to a service provider via a network. For the purpose of this discussion, a service provider can provide telecommunication services, wireless voice, messaging, and data services, computer networking services, broadband services, connectivity services, etc. A quality of service offered by a service provider can be impacted by various factors. For instance, in some examples, locations of communication transmitting stations associated with a service provider can affect the quality of reception available for devices associated with the service provider. Accordingly, the quality of service can vary by service provider. In at least one example, the quality of service can vary based on geographic location, due to changing conditions, landscapes, etc. In additional and/or alternative examples, the quality of service can vary based on a device type.

In at least one example, a coverage map, as described above, can graphically illustrate changes to the quality of reception of service in a geographical area. For the purpose of this discussion, coverage can correspond to the quality of reception of service. In at least one example, techniques described herein can access data from devices associated with a service provider and generate coverage maps based at least in part on the data. That is, the techniques described herein can access data that is crowd-sourced from a plurality of devices. For the purpose of this discussion, the data can be called user data. The user data can be aggregated by location to determine the coverage that is available for a device in, or within a threshold distance of, the location. In at least one example, the coverage can be determined based at least in part on a level of technology that is available in the location (e.g., 4G LTE, 4G, 3G, 2G), a signal strength, a speed associated with downloading, browsing, or using data, voice call, data, and/or video experience, etc.

In at least one example, the techniques described herein can include verifying coverage based on the aggregated user data. For the purpose of this discussion, verified coverage can indicate that devices associated with the service provider have successfully connected to the service provider via the network above a threshold number of times. Verified coverage can provide an additional layer of confidence to user(s) associated with a service provider by offering tangible evidence that other user(s) have successfully connected to the service provider via the network in a location. That is, the techniques described herein enable user(s) to consider coverage information that represents real world conditions and accurately represents coverage in the location.

The techniques described herein can include generating a user interface that is configured to present coverage information. In at least one example, the user interface can be a coverage map. In some examples, a coverage map can show users accurate and detailed information about coverage in locations on the map. Additionally, a coverage map can provide users with information about the coverage that is available in a location (e.g., level of technology (e.g., 4G LTE, 4G, 3G, 2G), a signal strength, a speed associated with downloading, browsing, or using data, voice call, data, and/or video experience, etc.). In at least one example, a coverage map can convey to users that coverage in a location has been verified. That is, a coverage map can convey to users that devices associated with a service provider have successfully connected to the service provider via the network a threshold number of times in, or around, the location. In some examples, a particular graphical element can be used to convey verified coverage information to the user(s) via a coverage map.

In at least one example, the user interface can be configured to present personalized coverage information to user(s). In some examples, the service provider can determine a location of a device associated with a user and can cause a coverage map specific to the location of the device to be presented via the user interface. In such examples, the coverage map can be specific to the service provider associated with the user and/or the device associated with the user. In at least one example, the coverage map can identify retail locations of the service provider on the map. In other examples, the service provider can receive input indicating a location of interest to a user. For instance, a user can input a search query associated with an address or interact with a particular location on a map. Based at least in part on receiving the input, the service provider can cause a coverage map specific to the location to be presented via the user interface. In at least one example, the coverage map can be specific to the service provider associated with the user and/or the device associated with the user.

In additional and/or alternative examples, a coverage map can show an accurate and detailed comparison of coverage that is available via various service providers. In such examples, user(s) can compare the coverage offered by each of the service providers to determine which service provider offers the best coverage in a particular location—based at least in part on user data collected from devices that have connected to the service provider by the network. Additionally and/or alternatively, a coverage map can be associated with a single service provider and a user interface can be configured to present two or more coverage maps in the user interface. In such examples, the two or more coverage maps can be displayed in a side-by-side arrangement to enable user(s) to compare coverage associated with the two or more service providers corresponding to the two or more coverage maps.

In some examples, the service provider can generate user interfaces that provide coverage information to user(s) without using a coverage map. For instance, in at least one example, the service provider can leverage the coverage data described herein to generate graphs, tables, charts, etc. that compare coverage available via different service providers. Additionally and/or alternatively, the service provider can leverage the coverage data to determine rankings between service providers, advantages of subscribing to one service provider over another service provider, etc.

FIG. 1 is a schematic diagram illustrating an example environment 100 for verifying coverage using data associated with devices communicatively coupled to a service provider. The example environment 200 can include a service provider 102, network(s) 104, user(s) 106, and device(s) 108 corresponding to individual ones of the user(s) 106.

In at least one example, the service provider 102 can be a telecommunications service provider that can provide telecommunication services, wireless voice, messaging, and data services, computer networking services, broadband services, connectivity services, etc. Examples of telecommunications service providers include, but are not limited to, T-MOBILE®, VERIZON®, AT&T®, SPRINT®, etc. In various webservice or cloud based embodiments, the service provider 102 can collect data from one or device(s) 108 corresponding to individual ones of the user(s) (i.e., user data), analyze user data associated with the device(s) 108, determine coverage data based at least in part on the user data, and generate user interfaces configured to present coverage maps via the device(s) 108.

The network(s) 104 can facilitate communication between device(s) 108 and service providers (e.g., service provider 102). In some examples, the network(s) 104 can be any type of network known in the art, such as the Internet, a cellular network, etc. The device(s) 108 can communicatively couple to the network(s) 104 in any manner, such as by a global or local wired or wireless connection (e.g., local area network (LAN), intranet, etc.), cellular connection, etc.

User(s) 106 can be associated with device(s) 108 that are configured to interact with the service provider 102 via the network(s) 104, as described above. Device(s) 108 can represent a diverse variety of device types and are not limited to any particular type of user device. Examples of device(s) 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, smartphones, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like. While device(s) 108 are shown in FIG. 1 as associated with the service provider 102, in additional and/or alternative examples, device(s) 108 can be associated with third party sources and systems. In at least one example, the data associated therewith can be accessible by the service provider 102.

The service provider 102 can include one or more servers and/or other machines 110, which can include one or more processing units 112 and computer-readable media 114. The one or more servers and/or other machines 110 can include device(s). Examples support scenarios where device(s) that can be included in the one or more servers and/or other machines 110 can include one or more computing devices that operate in a cluster or other grouped configuration to share resources, balance load, increase performance, provide fail-over support or redundancy, or for other purposes. Device(s) that can be included in the one or more servers and/or other machines 110 can represent, but are not limited to, desktop computers, server computers, web-server computers, personal computers, mobile computers, laptop computers, tablet computers, wearable computers, implanted computing devices, telecommunication devices, smartphones, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device. Thus, although illustrated as server computers, device(s) can include a diverse variety of device types and are not limited to a particular type of device.

Device(s) that can be included in the one or more servers and/or other machines 110 can include any type of computing device having one or more processing units 112 operably connected to computer-readable media 114 such as via a bus, which in some instances can include one or more of a system bus, a data bus, an address bus, a PCI bus, a Mini-PCI bus, and any variety of local, peripheral, and/or independent buses. Processing unit(s) 112 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processing unit(s) 112 can execute one or more modules and/or processes to cause the one or more servers and/or other machines 110 to perform a variety of functions, as set forth above and explained in further detail in the following disclosure. Additionally, each of the processing unit(s) 112 can possess its own local memory, which also can store program modules, program data, and/or one or more operating systems.

Device(s) that can be included in the one or more servers and/or other machines 110 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, an image camera, a depth sensor, and the like) and/or output peripheral devices (e.g., a display, a printer, audio speakers, a haptic output, and the like). Device(s) that can be included in the one or more servers and/or other machines 110 can also include one or more network interfaces coupled to the bus to enable communications between computing devices and other networked devices such as device(s) 108. Such network interface(s) can include one or more network interface controllers (NICs) or other types of transceiver devices to send and receive communications over a network. For simplicity, some components are omitted from the illustrated devices.

As described above, device(s) that can be included in the one or more servers and/or other machines 110 can include any type of computing device having one or more processing units 112 operably connected to computer-readable media 114 such as via a bus, which in some instances can include one or more of a system bus, a data bus, an address bus, a PCI bus, a Mini-PCI bus, and any variety of local, peripheral, and/or independent buses. Depending on the exact configuration and type of the one or more servers and/or other machines 110, the computer-readable media 114, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 114 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the servers and/or other machines 110. Any such non-transitory computer-readable media can be part of the servers and/or other machines 110.

In contrast, communication media includes computer readable instructions, data structures, program modules, or other data in a modulated data signal, such as a carrier wave, or other transmission mechanism. As defined herein, computer storage media does not include communication media.

The computer-readable media 114 can include one or more modules and data structures including, for example, a data collection module 116, a coverage determination module 118 including a technology determination module 120, a signal determination module 122, a verification module 124, and a speed determination module 126, a presentation module 128, and a database 130. The one or more modules and data structures can be in the form of stand-alone applications, productivity applications, an operating system component, or any other application or software module having features that facilitate interactions between the device(s) 108 and the service provider 102.

The data collection module 116 can access, receive, and/or determine user data associated with activities between device(s) (e.g., device(s) 108) and service provider (s) (e.g., service provider 102) via a network (e.g., network 104). In at least one example, the user data can include logs. In some examples, the data collection module 116 can access, receive, and/or determine logs from the device(s) 108 that are communicatively coupled to the service provider 102 via the network(s) 104. In other examples, the data collection module 116 can access, receive, and/or determine logs associated with activities from third party sources and/or systems. For instance, in at least one example, at least some of the logs from the device(s) 108 can be associated with activity between the device(s) 108 and a service provider other than service provider 102. In such examples, the service provider 102 can have permission to access such logs, as described below.

The logs can include data indicating voice, messaging, and data activity of individual device(s) 108. For instance, the logs can indicate calls made by a device 108, data uploads by a device 108, data downloads by a device 108, messages sent by a device 108, messages received by a device 108, videos watched via a device 108, etc. Additionally and/or alternatively, the logs can indicate failed attempts of a device 108 to make a call, upload data, download data, send a message, receive a message, watch a video, etc. In at least one example, a log can correspond to an activity and can be associated with data associated with the activity. The data can include, but is not limited to, date/time data, device data, network data, location data, signal strength data, throughput data, voice data, video data, etc.

Date/time data can indicate a date and/or time associated with an activity corresponding to a log. In some examples, the date and time can be associated with a date and/or time corresponding to an activity associated with a device 108. In additional and/or alternative examples, the date and/or time can be associated with a date and/or time corresponding to an activity associated with servers and/or other machines 110. Device data can indicate information about a device 108 associated with an activity corresponding to a log. Device data can indicate the device model, device type, device version, etc. of the device 108 associated with an activity corresponding to a log. Additionally, device data can indicate a technology that is available on the device 108 associated with the activity corresponding to a log.

Network data can indicate information about a network associated with an activity corresponding to a log. Network data can indicate the network, network carrier (i.e. service provider), etc. associated with an activity corresponding to a log. Additionally and/or alternatively, network data can indicate a tower (i.e., communication transmitting stations), tower location, etc. associated with an activity corresponding to a log. Location data can indicate a geographical location associated with an activity corresponding to a log. Location data can indicate the latitude and longitude of a device 108 associated with an activity corresponding to a log. Additionally and/or alternatively, location data can indicate an accuracy of the location measurement (e.g., latitude and longitude) of the activity corresponding to the log.

Signal strength data can indicate information about a signal associated with an activity corresponding to a log. Signal strength data can include an arbitrary strength unit (ASU) value associated with an activity corresponding to a log. Additionally and/or alternatively, the signal strength data can include the signal strength (in decibels/milliwatt (dBm)) and/or signal quality associated with an activity corresponding to a log. The signal quality can include an error rate. Throughput data can indicate information about data speeds associated with an activity corresponding to a log. Throughput data can indicate a measure of data transfer speed in megabits per second (Mbps). For instance, throughput data can indicate a download speed, upload speed, and/or latency associated with an activity corresponding to a log.

Voice data can indicate a quality of a voice call experience. For instance, voice data can indicate an ability to make a call, an ability to retain a call, an audio quality associated with a call, call setup time, etc. Video data can indicate a quality of video experience. For instance, video data can indicate video streaming quality, video performance, etc.

The date/time data, device data, network data, location data, signal strength data, throughput data, voice data, video data, etc. described above are non-limiting examples of data that can be accessed, received, and/or determined by the data collection module 116. Additional and/or alternative data can be accessed, received, and/or determined by the data collection module 116. The data collection module 116 can access, receive, and/or determine the data described above, and can aggregate the data for further processing.

In some examples, the data collection module 116 can request permission before accessing, receiving, and/or determining data associated with the device(s) 108. For instance, the data collection module 116 can request to access information that includes personally identifiable information (PII) that identifies or can be used to identify, contact, or locate a person to whom such information pertains. In such examples, a user 106 can be provided with notice that the systems and methods herein are accessing PII. Additionally, prior to initiating PII data collection, users 106 can have an opportunity to opt-in or opt-out of the PII data collection. For example, a user 106 can opt-in to the PII data collection by taking affirmative action indicating that he or she consents to the PII data collection. Alternatively, a user 106 can be presented with an option to opt-out of the PII data collection. An opt-out option can require an affirmative action to opt-out of the PII data collection, and in the absence of affirmative user action to opt-out, PII data collection can be impliedly permitted. In at least one example, the data collection module 116 can request such permission from a source generating the data (e.g., a third party source or system, as described above). The data collection module 116 can also leverage various security mechanisms to encrypt or otherwise protect data associated with the user(s) 106 that can be accessed, received, and/or determined in the data collection module 116.

The coverage determination module 118 can access data aggregated by the data collection module 116, analyze the data, and determine coverage data corresponding to geographical locations. The coverage determination module 118 can utilize one or more other modules to determine the coverage data. In at least one example, the technology determination module 120 can determine a level of technology that is available in a geographical location, the signal determination module 122 can determine the strength of signal in the geographical location, the verification module 124 can determine whether coverage in the geographical location is verified coverage, and the speed determination module 126 can determine the data speeds associated with uploads, downloads, latency, etc. That is, the coverage determination module 118 can determine data associated with types of technology, signal strengths, data speeds, and coverage verification that can be used to generate coverage maps, as described below. Additionally and/or alternatively, the coverage determination module 118 can determine voice quality, data quality, video quality, etc. of a user experience. Additional details associated with the technology determination module 120, the signal determination module 122, the verification module 124, and the speed determination module 126 are described below in FIG. 2.

The presentation module 128 can access coverage data determined by the coverage determination module 118. In at least one example, the presentation module 128 can generate a coverage map to visually represent the coverage determined by the coverage determination module 118. The presentation module 128 can cause the map to be presented via a device 108 associated with a user 106. A non-limiting example of a coverage map 132 is illustrated in FIG. 1. The coverage map 132 can be presented via a display 134 of a device 108. In some examples, the device 108 can be a device 108 from which data was collected by the data collection module 116, or a different device 108. In at least one example, the coverage map can be interactive such that user(s) 106 can interact with the coverage map to access information associated with coverage in particular geographic locations. Additional details associated with the coverage maps are described below in FIG. 3.

In additional and/or alternative examples, the presentation module 128 can leverage the coverage data to generate user interfaces that are configured to present coverage information to user(s) 106 in a way other than a coverage map. For instance, the presentation module 128 can generate user interfaces that depict graphs, tables, charts, etc. Additionally and/or alternatively, the presentation module 128 can generate user interfaces that communicate rankings between service providers, advantages of subscribing to one service provider over another service provider, etc.

The database 130 can store data that is organized so that it can be accessed, managed, and updated. In at least one example, the user data accessed, received, and/or determined by the data collection module 116 can be aggregated and stored in the database 130. Additionally and/or alternatively, coverage data determined by the coverage determination module 118 can be stored in the database 130. In at least one example, data associated with technology levels, signal strengths, data speeds, coverage verification, voice call, data, and/or video experience, etc. can be stored in the database 130. In at least one example, the coverage data can be mapped to, or otherwise associated with, areas representative of geographic locations, as described below. In some examples, coverage data associated with more than one service provider can be mapped to, or otherwise associated with, the areas in the database 130. The data stored in the database 130 can be updated at a particular frequency, in predetermined intervals, after a lapse of a predetermined amount of time, responsive to an occurrence of an event (e.g., new activity, etc.), etc.

Figure 2:
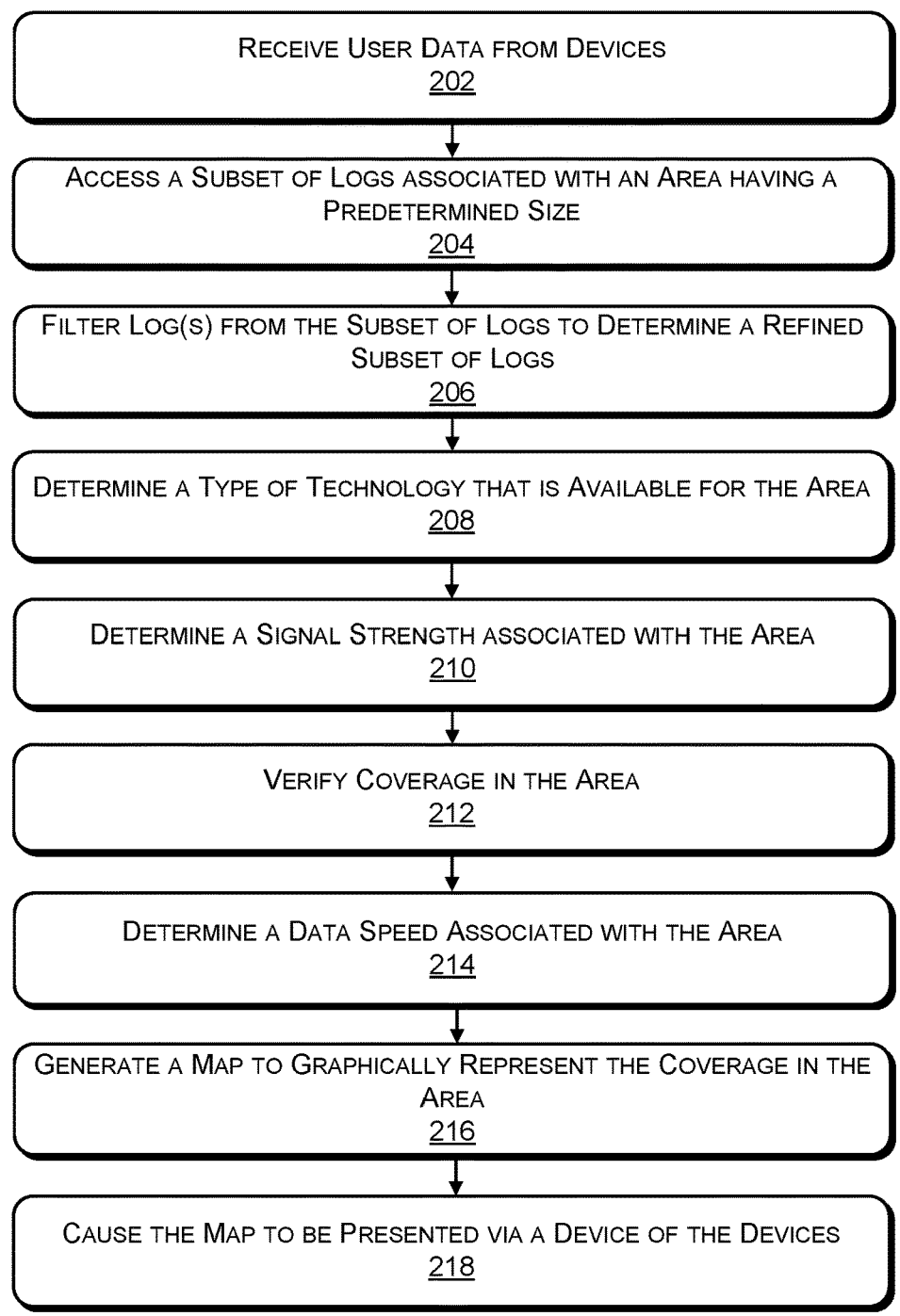
FIG. 2 is a flow diagram that shows an example process for determining coverage based at least in part on data associated with devices communicatively coupled to a service provider, and generating a map to graphically represent the determined coverage.

FIG. 2 is a flow diagram that shows an example process 200 for determining coverage based at least in part on data associated with devices (e.g., device(s) 108) communicatively coupled to a service provider (e.g., service provider 102), and generating a map to graphically represent the determined coverage.

Block 202 illustrates receiving user data from devices (e.g., device(s) 108). As described above, the data collection module 116 can access, receive, and/or determine data associated with activities between devices (e.g., device(s) 108) and service provider(s) (e.g., service provider 102) via network(s) (e.g., network 104) over a period of time. In at least one example, user data can include data associated with voice, messaging, data, etc. activities associated with device(s) 108. In such an example, individual activities can respectively correspond with logs, as described above. In at least one example, each log can be associated with data associated with an activity. The data can include, but is not limited to, date/time data, device data, network data, location data, signal strength data, throughput data, voice data, video data, etc., as described above.

Blocks 204-214 illustrate analyzing the data to determine coverage data in an area having a predetermined size. As described above, the coverage determination module 118 can access data aggregated by the data collection module 116 over a period of time, analyze the data, and determine the coverage data associated with individual geographical locations. In at least one example, a geographical location can be partitioned into one or more areas, each having a predetermined size. The coverage determination module 118 can utilize the technology determination module 120 to determine levels of technology that are available in an area of the one or more areas, the signal determination module 122 to determine the strength of signal in the area, the verification module 124 to determine whether coverage in the area is verified coverage, and the speed determination module 126 to determine the speed associated with uploads, downloads, etc. in the area (i.e., data speeds). Such coverage data can be mapped to, or otherwise associated with, the area. In at least one example, the coverage data can be leveraged by the presentation module 128 to generate a coverage map, as described herein. Based at least in part on piecing together each of the areas corresponding to a geographical location (e.g., via a coverage map), user(s) 106 can understand coverage information for the geographical area.

As described above, in at least one example, the coverage determination module 118 can determine the coverage available in a geographical location based at least in part on determining coverage associated with one or more areas corresponding to the geographical location. Each area can have a predetermined size (e.g., 10 m×10 m, 100 m×100 m, 1 km×1 km, etc.). The predetermined size can be determined based at least in part on identifying an area that is large enough to be associated with activity from a variety of device(s) 108 and to account for varying conditions that affect coverage in an area, but that is small enough to provide a meaningful indicia of coverage.

Block 204 illustrates accessing a subset of logs associated with an area. In at least one example, the signal determination module 122 can access a subset of the user data corresponding to activities associated with the area. That is, the signal determination module 122 can access logs associated with activities that were initiated at device(s) 108 located in the area and/or terminated at device(s) 108 located in the area.

Block 206 illustrates filtering one or more logs from the subset of logs to determine a refined subset of logs. In at least one example, the coverage determination module 118 can filter the subset of logs based at least in part on one or more rules. The one or more rules can relate to location accuracy, signal strength, recency, etc. That is, the coverage determination module 118 can remove one or more logs from the subset of logs based at least in part on determining that one or more logs does not satisfy one or more rules. Based at least in part on removing the one or more logs, the coverage determination module 118 can determine a refined subset of logs.

The coverage determination module 118 can access the data associated with each log in the subset of logs to determine whether each log satisfies the one or more rules. As described above, the one or more rules can relate to location accuracy, signal strength, recency, etc. For instance, in at least one example, the coverage determination module 118 can access the data associated with each log in the subset of logs to determine whether each log is associated with a location accuracy that is below a threshold location accuracy, within a range of threshold accuracies, etc. For instance, the coverage determination module 118 can remove a log from the subset of logs based at least in part on determining that the location accuracy associated with the log is above a threshold, outside of a range, etc. Accordingly, each log in the refined subset of logs can be associated with a location accuracy that is below a threshold location accuracy, within a range of threshold accuracies, etc. As a non-limiting example, each log in the refined subset of logs can be associated with a Global Positioning System accuracy of less than 40 meters (e.g., the threshold can be determined to be 40 meters).

Additionally and/or alternatively, in at least one example, the coverage determination module 118 can access the data associated with each log in the subset of logs to determine whether each log is associated with a signal strength within a range of signal strengths, etc. In at least one example, the coverage determination module 118 can remove a log from the subset based at least in part on determining that the signal strength associated with the log is outside of a range of signal strengths. Accordingly, in at least one example, each log in the refined subset of logs can be associated with a signal strength that is within the range of signal strengths. As a non-limiting example, each log in the refined subset of logs can be associated with a signal strength between −124 dBm and −40 dBm.

Moreover, in some examples, the coverage determination module 118 can access the data associated with each log in the subset of logs to determine whether each log was accessed, received, and/or determined within a specified period of time (e.g., one week, three months, etc.) to ensure that the data is not stale. In some examples, more than one specified period of time can be combined. In at least one example, the coverage determination module 118 can remove a log from the subset based at least in part on determining that the log was accessed, received, and/or determined at a time outside of the specified period of time. Accordingly, in at least one example, each log in the refined subset of logs can have been accessed, received, and/or determined within the specified period of time. As a non-limiting example, each log in the refined subset of logs can have been accessed, received, and/or determined within the past three months.

Block 208 illustrates determining a type of technology that is available for the area. In at least one example, the technology determination module 120 can determine a level of technology that is available for the area. In some examples, the technology determination module 120 can access data associated with estimations or predictions with respect to the levels of technology that are available in the area. In other examples, the technology determination module 120 can access the refined subset of the logs corresponding to activities in the area. The technology determination module 120 can determine technology levels associated with each log of the refined subset of logs and can determine all levels of technology that are available for the area. Examples of technologies include Global System for Mobile Communications (GSM), Universal Mobile Telecommunications System (UMTS), Long-Term Evolution (LTE), etc.

A lowest-level of technology can be GSM, which is a second generation (2G) digital cellular system that can be used by device(s) 108. GSM enables user(s) 106 to use call functionality and text/picture messaging. UMTS is a third generation (3G) mobile cellular system that can be used by device(s) 108. The UMTS standard is based on the GSM standard. UMTS enables user(s) 106 to use call functionality, text/picture messaging, and data transmission functionality. That is, UMTS is a higher-level technology than GSM. LTE is a fourth generation (4G) wireless communication standard that enables high-speed data transmission for device(s) 108. LTE is based on UMTS and GSM. LTE enables user(s) 106 to use high definition (HD) call functionality, text/picture messaging, and high-speed data transmission functionality. That is, LTE is a higher-level technology than UMTS and GSM. GSM, UMTS, and LTE are non-limiting examples of technologies that can be associated with the activities described herein. Additional and/or alternative technologies can be considered. For instance, a technology level above LTE can include a technology that enables user(s) 106 to use HD call functionality, text/picture messaging, and faster data transmission functionality than is available via LTE.

Block 210 illustrates determining a signal strength associated with the area. The signal determination module 122 can determine the signal strength based at least in part on the signal strength data associated with individual logs of the refined subset of the logs. As described above, signal strength data can include an arbitrary strength unit (ASU) value associated with an activity corresponding to a log. Additionally and/or alternatively, the signal strength data can include the signal strength (in decibels/milliwatt (dBm)) and/or signal quality associated with an activity corresponding to a log. The signal quality can include an error rate. In at least one example, the signal determination module 122 can determine an average (mean), a median, a mode, or other measure of central tendency of the signal strengths associated with each of the logs in the refined subset of logs corresponding to activities in the area to determine a signal strength associated with the area.

In at least one example, the signal determination module 122 can leverage the signal strength determined for the area to qualify the signal strength. For instance, in some examples, based at least in part on determining that the signal strength associated with an area is above a first threshold, or within a first range of values, the signal determination module 122 can determine that the signal strength is a first quality (e.g., excellent). In other examples, based at least in part on determining that the signal strength associated with an area is below a second threshold, or within a second range of values, the signal determination module 122 can determine that the signal strength is a second quality (e.g., fair). In additional and/or alternative examples, based at least in part on determining that the signal strength associated with an area is below the first threshold and above the second threshold, or within a third range of values, the signal determination module 122 can determine that the signal strength is a third quality (e.g., good). The qualified signal strengths can be incorporated into coverage maps and can convey signal strengths to user(s) 106 in a way that is easier to understand.

Block 212 illustrates verifying coverage in the area. As described above, verified coverage can indicate that devices 108 associated with the service provider 102 have successfully connected to the service provider 102 via the network 104 over a threshold number of times in the area. The verification module 124 can verify coverage in the area based at least in part on positive and, in some examples, negative logs. In at least one example, the verification module 124 can verify coverage in an area for more than one technology level. That is, the verification module 124 can verify each technology level that is available for an area. In such examples, the verification module 124 can verify each technology level independently. Each verified level of technology can be mapped and displayed differently in the coverage map, as described below.

For a particular technology level is available for a device 108 in the area, in at least one example, the verification module 124 can access logs in the refined subset of logs and can determine that a log is a positive log based at least in part on determining that the log represents a successful connection between a device 108 and the service provider 102 using the particular level of technology. As a non-limiting example, in the context of 4G LTE technology, the technology determination module 120 can determine that 4G LTE technology is available for a first device 108 for an area. Based at least in part on determining that the first device 108 successfully connected to the service provider 102 via 4G LTE technology, the verification module 124 can determine that the corresponding log is a positive log in the context of 4G LTE technology. Additionally and/or alternatively, in the context of UMTS technology, a second device 108 can have UMTS technology. Based at least in part on determining that the second device 108 successfully connected to the service provider 102 via UMTS technology, the verification module 124 can determine that the corresponding log is a positive log in the context of UMTS technology, even though 4G LTE may be the highest-level of technology available for the area.

Alternatively, the verification module 124 can determine a negative log based at least in part on determining a successful connection between a device 108 and the service provider 102 using a level of technology that is lower than the particular level of technology that is available for a device 108 in the area. That is, the verification module 124 can access logs in the refined subset of logs and can determine that a log is a negative log based at least in part on determining that the log represents a successful connection between a device 108 and the service provider 102 using a technology level that is less than the particular level of technology available in the area, provided the device 108 is capable of the particular level of technology. Additionally and/or alternatively, the verification module 124 can determine a negative log based at least in part on determining that a log of the refined subset of logs is associated with a no service signal. That is, a log associated with a failed attempt at transmitting data can be determined to be a negative log.

As an example, the verification module 124 can determine that a log associated with UMTS, GSM, or no service is a negative log when 4G LTE is available in an area and the device 108 is capable of 4G LTE technology. Or, a log associated with GSM or no service can be determined to be a negative log when UMTS is available in an area and the device 108 is capable of UMTS technology. Further, a log associated with no service can be determined to be a negative log when GSM is available in an area and the device 108 is capable of GSM technology.

In at least one example, for a particular technology level that is available in an area, the verification module 124 can determine that coverage in an area is verified based at least in part on determining that a number of positive logs meets or exceeds a threshold number. As a non-limiting example, for each area, the verification module 124 can determine that the coverage in the area is verified if the threshold number is ten and ten or more logs are determined to be positive logs. In at least some examples, the verification module 124 can compare the number of positive logs to the number of negative logs to determine the number of positive logs relative to the number of negative logs. In such examples, the verification module 124 can determine that coverage in an area is verified based at least in part on determining that a number of positive logs meets or exceeds a threshold number and determining that the number of positive logs exceeds a number of negative logs associated with the area. The negative logs can include all logs associated with successful connections between a device 108 and the service provider 102 using technology levels that are less than the particular level of technology available in the area, provided the device 108 is capable of the particular level of technology and/or no service signals. Based at least in part on determining that the number of positive logs meets or exceeds a threshold number and, in some examples, determining that the number of positive logs exceeds a number of negative logs associated with the area, the verification module 124 can determine that the coverage associated with the area is verified for the technology layer that is being evaluated. The verification module 124 can repeat the aforementioned process for each technology layer that is available in the area.

In at least one example, the verification module 124 may not be able to determine whether coverage in an area is verified. In some examples, not being able to determine whether coverage in an area is verified can be represented the same as determining that coverage in the area is not verified. In other examples, not being able to determine whether coverage in an area is verified can be represented to differentiate between coverage not being verified and not being able to determine whether coverage in an area is verified.

The aforementioned process for verifying coverage is but one example and additional and/or alternative processes of verifying coverage can be used. For instance, in at least one example, coverage can be verified based at least in part on a ration of positive to negative signal strength logs, positive to negative call logs, positive to negative speed and/or video logs, any combination of the foregoing, etc.

Block 214 illustrates determining a data speed associated with the area. The speed determination module 126 can determine data speeds based at last in part on the throughput data associated with individual logs of the refined subset of the logs. As described above, throughput data can be a measure of data transfer speed in megabits per second (Mbps). For instance, throughput data can indicate a download speed, upload speed, and/or latency associated with an activity corresponding to a log. In at least one example, the speed determination module 126 can determine an average (mean), a median, a mode, or other measure of central tendency of the throughput data associated with each of the logs in the refined subset of logs corresponding to activities in the area to determine data speeds associated with the area over a period of time. In at least some examples, the speed determination module 126 can determine a speed associated with an area based at least in part on determining that the number of logs in the refined subset of logs exceeds a threshold number and/or the coverage in the area has been verified.

Block 216 illustrates generating a map to graphically represent the coverage in the area. The map generation module 126 can access coverage data determined by the coverage determination module 118. That is, in at least one example, the map generation module 126 can access data associated with the level of technology that is available for the area, data associated with the signal strength associated with the area, data indicating whether the coverage is verified in the area, and/or the data speed associated with the area. In additional and/or alternative examples, the map generation module 126 can access additional and/or alternative data as it relates to coverage. The map generation module 126 can generate a coverage map to visually represent the coverage determined by the coverage determination module 118. The map generation module 126 can cause the map to be presented via a device 108 associated with a user 106, as illustrated in block 218. Additional details associated with the coverage maps are described below in FIG. 3.

As described above, in at least one example, the presentation module 128 can leverage the coverage data to generate user interfaces that convey coverage information in other configurations in addition to and/or alternative to a coverage map.

Figure 3:
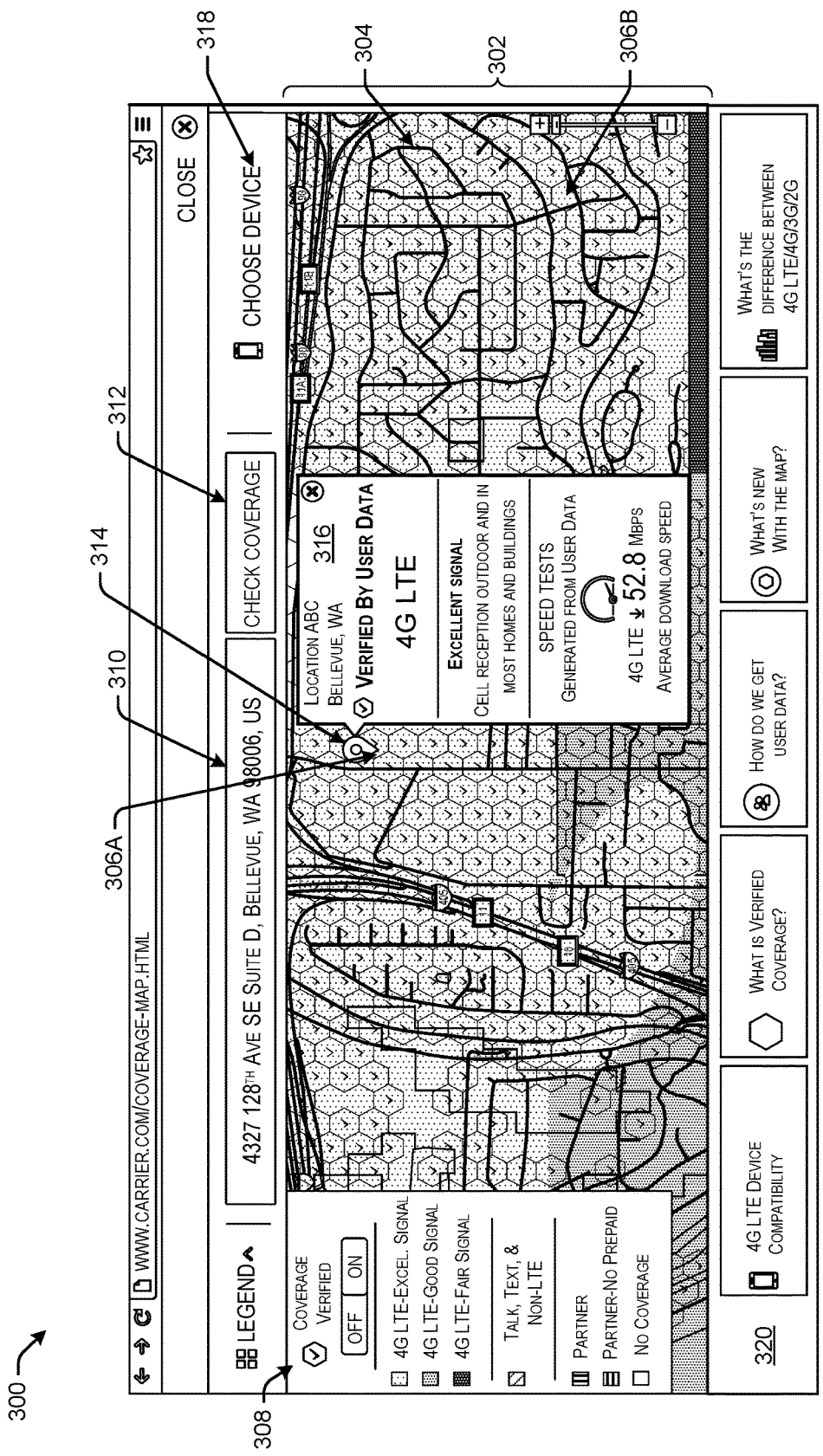
FIG. 3 is a schematic diagram illustrating an example user interface for presenting a coverage map.

FIG. 3 is a schematic diagram illustrating an example user interface 300 for presenting a coverage map 302. The coverage map 302 can be associated with a map of a geographical location. In some examples, the map can be associated with a high-level of granularity (e.g., a country, a state, a city, etc.). In other examples, the map can be associated with a low-level of granularity (e.g., portion of a city, a neighborhood, a street, etc.), as illustrated in FIG. 3. A user 106 can interact with the user interface 300 to zoom in, zoom out, enlarge, reduce, etc. the granularity associated with the coverage map. In at least one example, the coverage data corresponding to higher-levels of granularity can be determined based at least in part on aggregating coverage data associated with the lower-levels of granularity. For instance, a plurality of individual areas (e.g., tiles, described below) can be combined to represent a zip code, neighborhood, community, etc. In such examples, the coverage data associated with each of the individual areas in the plurality of individual areas can be aggregated and an average (mean), a median, a mode, or other measure of central tendency can be determined for the zip code, neighborhood, community, etc.

The coverage map 302 in FIG. 3 is a graphical representation of a portion of a city. The lines 304 depicted throughout the coverage map 302 can represent streets, highways, interstates, etc. Additional and/or alternative landmarks can be incorporated into the coverage map 302 to provide context to user(s) 106.

As described above, a geographical location can be associated with one or more areas, each having a predetermined size. In at least one example, the coverage map 302 can be partitioned into tiles 306A, 306B, etc. (collectively 306), each representing an area having same predetermined size. As a non-limiting example, each tile 306A, 306B, etc. can represent a 100 m×100 m area. In FIG. 3, the tiles 306 are shown to have a hexagonal shape. However, the tiles 306 can be any shape (e.g., substantially square, substantially rectangular, substantially triangular, substantially circular, substantially diamond, substantially ovular, etc.) and are not limited to having hexagonal shapes.

The user interface 300 can include various interface components. In at least one example, the user interface 300 can include a legend 308. The legend can provide a user 106 with information so that the user 106 can understand the coverage map 302. The legend 308 can identify whether a coverage verification notation is turned on or off. In at least one example, the coverage verification notation can be associated with a graphical element that can be presented in association with individual ones of the tiles 306 that have been verified via user data, as described above. For instance, tile 306A is depicted with a check mark. The check mark can be the graphical element indicating that the area associated with tile 306A has been verified by user data. Alternatively, tile 306B is not associated with a check mark. Accordingly, the area associated with tile 306B has not been verified by user data. Additional and/or alternative graphical elements can be used to denote that coverage has been verified in an area. For instance, a tile can be associated with an "x", can be associated with a different color than other tiles, etc.

In at least one example, different presentations can be utilized to differentiate coverage that is available in each of the tiles 306. For instance, in at least one non-limiting example, a first color can convey that coverage data is not available to determine whether coverage is verified, a second color can convey that coverage data indicates that coverage is not verified, a third color can convey that coverage data indicates that a number of device(s) 108 above a first threshold 108 have successfully connected to the service provider 102, a fourth color can convey that coverage data indicates that a number of device(s) 108 above a second threshold have successfully connected to the service provider 102, etc. In at least one example, the coverage verification can correspond to a particular technology level, as described above. For instance, in some examples, each verified level of technology can be displayed differently in the coverage map, as described below.

In some examples, areas where coverage data has not been verified can be depicted to convey whatever coverage data is available. In some examples, the coverage data can be based at least in part on engineering estimates and/or models, as described above. In other examples, the coverage data can be based at least in part on user data; however, in some examples, the data can be insufficient to meet the threshold for coverage verification, as described above. As illustrated in tile 306B, the area represented by 306B can be associated with 4G LTE having an excellent signal; however, the data can be insufficient to meet the threshold for coverage verification, as described above. Additional details associated with coverage verification notations are described below in FIG. 4.

Additionally and/or alternatively, the legend 308 can include examples of coloration, shading, etc. to indicate different technology levels that are available in the coverage map 302, signal strengths associated with the coverage map 302, service providers associated with the coverage map 302, etc. Additional and/or alternative data can be surfaced via the legend. As illustrated in coverage map 302, a large majority of the coverage map 302 is associated with 4G LTE technology having an excellent signal strength. A portion of the coverage map 302 is associated with 4G LTE having a good signal, and a very small portion of the coverage map 302 is associated with 4G LTE having a fair signal.

In at least one example, the user interface 300 can include a search bar 310. The search bar can enable user(s) 106 to input locations for which he or she is interested in accessing coverage data. For instance, in FIG. 3, the user 106 input 4327 128$^{th}$ Ave. SE, Suite D, Bellevue, Wash. 98006, USA. The user 106 can actuate a control (e.g., control 312) to initiate the search (e.g., request coverage data for the location associated with the search query). Based at least in part on receiving the search query, the presentation module 128 can determine the individual area corresponding to the search query and can access coverage data associated with the individual tile. In at least one example, the presentation module 128 can cause an interface element to be presented via the user interface that conveys the corresponding coverage data to the user 106. Additionally and/or alternatively, the presentation module 128 can present a portion of a coverage map that is zoomed in on the corresponding location of interest.

In at least one example, a graphical element 314 can represent a location of interest on the coverage map 302. The graphical element 314 can be a pin, a flag, a callout box, etc. In FIG. 3, graphical element 314 is positioned in a location on the coverage map 302 corresponding to the search in the search bar. Tile 306A corresponds to the area associated with the search. In additional and/or alternative examples, a user 106 can interact with a location on the coverage map 302 without inputting an address into the search bar 310. For instance, a user 106 can touch, click, or otherwise select a region on the coverage map 302 as his or her location of interest.

Based at least in part on determining a location of interest associated with a user 106, the presentation module 128 can determine the area corresponding to the location of interest. Additionally, the presentation module 128 can access coverage data associated with the area and can cause an interface element 316 associated with coverage data to be presented via the user interface 300. Additional details associated with the search functionality is described below in FIG. 5.

In at least one example, interface element 316 can be a popup, overlay, callout, etc. Interface element 316 can include graphical elements, textual elements, etc. that can be arranged in various configurations to convey coverage data to the user 106. As illustrated in FIG. 3, the interface element 316 can identify a location associated with the location of interest. Additionally, the interface element 316 can indicate that the coverage data represented has been verified by user data. Furthermore, the interface element 316 can identify a highest-level of technology available for the area, the signal strength, and/or data speeds.

As illustrated in FIG. 3, tile 306A corresponds to the location of interest. The coverage data associated with tile 306A has been verified by user data as denoted by the check mark in tile 306A and in the interface element 316. The interface element 316 indicates that the highest-level of technology that is available is 4G LTE, the signal associated with the area is excellent, and speed tests generated from user data indicate that the average download speed is 52.8 Mbps. Interface element 316 is a non-limiting example of an interface element configured to present a coverage data via user interfaces. Additional and/or alternative interface elements, textual elements, configurations, etc. can be used to present the same and/or similar information.

Furthermore, the user interface 300 can include a control (e.g., control 318), the actuation of which can cause a list of options to be presented to a user 106 via a popup, overlay, etc. The user 106 can input his or her device type to ensure that the coverage map 302 accurately reflects coverage available for his or her device 108. For instance, based at least in part on the user 106 indicating that the user 106 does not have a 4G LTE enabled device 108, the presentation module 128 can update the coverage map 302 to reflect coverage available for a device 108 that is not 4G LTE enabled. In at least one example, based at least in part on determining that the user 106 did not input a device type, the presentation module 128 can default to a highest-level technology that is available for the geographical location represented in the coverage map 302. Or, in additional and/or alternative examples, a user 106 can select different devices (e.g., an upgraded device, etc.) to determine how a device can change the coverage available in the area.

In at least some examples, the user interface 300 can include a portion 320 of the user interface 300 that can be associated with educational information, such as frequently asked questions, etc. For instance, the educational information can explain what verified coverage is, how user data is accessed, etc. Additional and/or alternative information can be provided via the portion 320 of the user interface 300.

User interface 300 is a non-limiting example of a user interface 300 configured to present a coverage map via device(s) 108. Additional and/or alternative graphical elements, textual elements, configurations, etc. can be used to present the same and/or similar information. In at least one example, the user interface 300 can be configured differently based at least in part on the device 108 presenting the user interface 300. For instance, a presentation of the user interface 300 on a mobile device can have a different layout, fewer interface components, etc. than the user interface 300 that is presented on a desktop computer. In additional and/or alternative examples, a geographical area can correspond to a neighborhood and individual areas associated with the neighborhood can be represented by images or landmarks associated with the neighborhood instead of tiles. As a non-limiting example, an area can correspond to the Queen Anne neighborhood of Seattle, Wash. A corresponding landmark can be the Space Needle or Denny Park and an image of the Space Needle or Denny Park can represent the an individual area. Or, in additional and/or alternative examples, the coverage map can correspond to a route of transportation (e.g., bus route, subway route, etc.) and individual locations along the bus route can correspond to individual areas. Each location can be associated with a representation of coverage available at the location.

Figure 4:
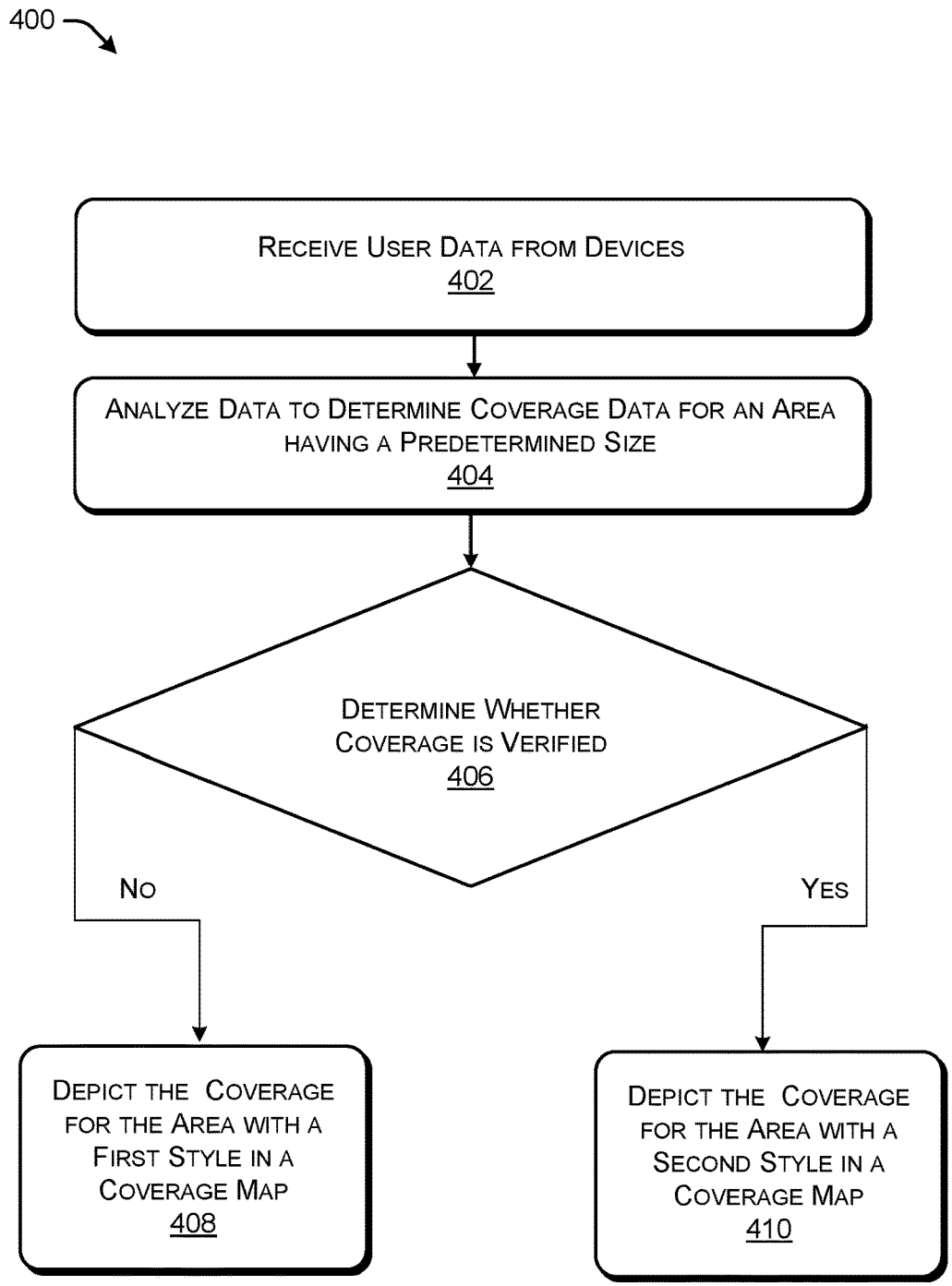
FIG. 4 is a flow diagram that shows an example process for determining a presentation of a coverage map based at least in part on determining whether coverage is verified.

FIG. 4 is a flow diagram that shows another example process 400 for determining a presentation of a coverage map based at least in part on determining whether coverage is verified.

Block 402 illustrates receiving user data from devices (e.g., device(s) 108). As described above, the data collection module 116 can access, receive, and/or determine data associated with activities between devices (e.g., device(s) 108) and service provider(s) (e.g., service provider 102) via network(s) (e.g., network 104). In at least one example, individual activities can respectively correspond with logs, as described above, and each log can be associated with data associated with an activity. The data can include, but is not limited to, date/time data, device data, network data, location data, signal strength data, throughput data, voice data, video data, etc., as described above.

Block 404 illustrates analyzing the data to determine coverage data for an area having a predetermined size. As described above, the coverage determination module 118 can access data aggregated by the data collection module 116, analyze the data, and determine the coverage data associated with individual geographical locations. In at least one example, a geographical location can correspond with one or more areas, each having a predetermined size. The coverage determination module 118 can utilize the technology determination module 120 to determine levels of technology that are available in an area of the one or more areas, the signal determination module 122 to determine the strength of signal in the area, the verification module 124 to determine whether coverage in the area is verified coverage, and the speed determination module 126 to determine the speed associated with uploads, downloads, etc. in the area (i.e., data speeds). Such coverage data can be mapped to, or otherwise associated with, the area.

Decision block 406 illustrates determining whether coverage is verified. As described above, verified coverage can indicate that device(s) 108 associated with the service provider 102 have successfully connected to the service provider 102 via the network 104 above a threshold number of times in the area. The verification module 124 can verify coverage in the area based at least in part on positive and, in some examples, negative logs. As described above, the verification module 124 can determine that coverage in an area is verified based at least in part on determining that a number of positive logs meets or exceeds a threshold number. As a non-limiting example, for each area, the verification module 124 can determine that the coverage in the area is verified if the threshold number is ten and ten or more logs are determined to be positive logs.

In at least some examples, the verification module 124 can compare the number of positive logs to the number of negative logs to determine the number of positive logs relative to the number of negative logs. In such examples, the verification module 124 can determine that coverage in an area is verified based at least in part on determining that a number of positive logs meets or exceeds a threshold number and determining that the number of positive logs exceeds a number of negative logs associated with the area. Based at least in part on determining that the number of positive logs meets or exceeds a threshold number and, in some examples, determining that the number of positive logs exceeds a number of negative logs associated with the area, the verification module 124 can determine that the coverage associated with the area is verified.

Based at least in part on determining that the coverage in the area is not verified or coverage data indicating that the coverage is verified is not available, the presentation module 128 can depict the coverage for the area with a first style in a coverage map, as illustrated in block 408. For instance, in at least one example, the presentation module 128 can cause the area to be associated with a color or pattern indicating coverage data associated with the area. Additionally and/or alternatively, in the at least one example, the presentation module 128 can exclude a graphical element from the area. Based at least in part on determining that the coverage in the area is verified, the presentation module 128 can depict the coverage for the area with a second style in a coverage map, as illustrated in block 410. For instance, in at least one example, the presentation module 128 can cause the area to be associated with a graphical element (e.g., a check, an "x", etc.) indicating that the coverage associated with the area is verified coverage. The graphical element can enable user(s) 106 to easily identify which areas of a coverage map are associated with verified coverage.

As a non-limiting example, tile 306A in FIG. 3 is associated with an area where coverage has been verified by user data and tile 306B in FIG. 3 is associated with an area where coverage has not been verified. However, based at least in part on the shading or coloration associated with tile 306B, a user 106 can expect 4G LTE coverage having an excellent signal.

As described above, in at least one example, the verification module 124 can verify coverage in an area for more than one technology level. That is, the verification module 124 can verify each technology level that is available for an area. In such examples, the verification module 124 can verify each technology level independently. In such examples, each verified layer of technology can be mapped and displayed differently in the coverage map.

Figure 5:
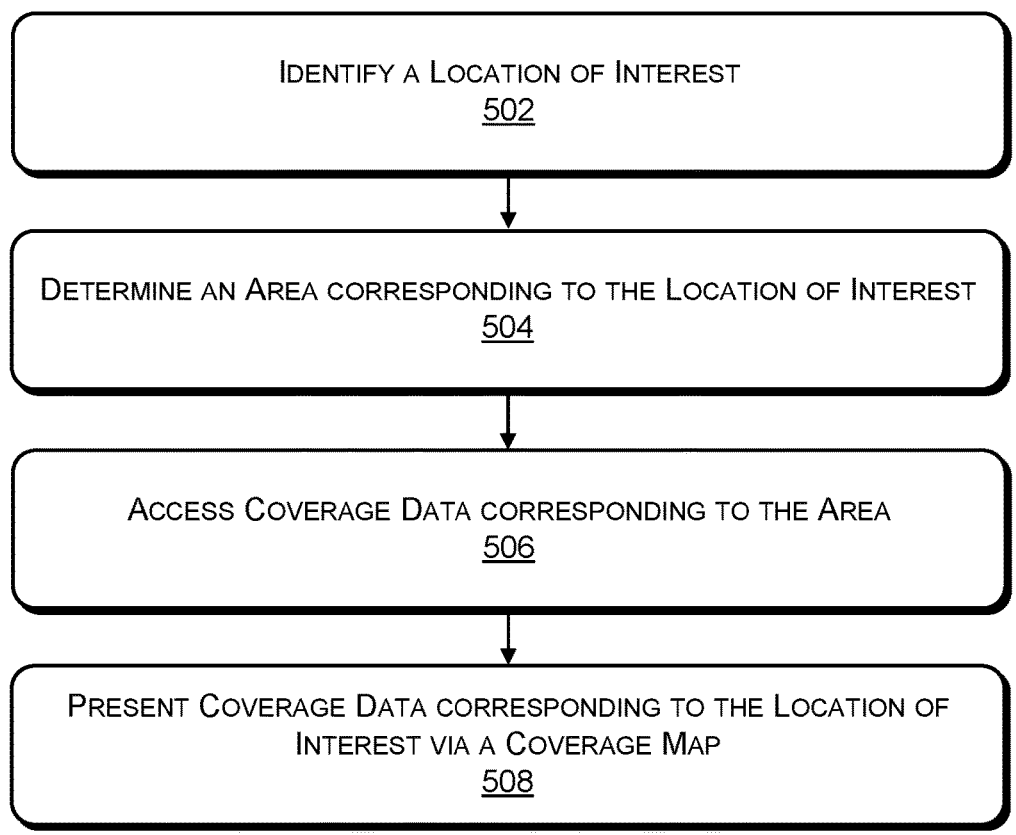
FIG. 5 is a flow diagram that shows an example process for causing coverage data to be presented based at least in part on receiving input indicating a location of interest.

FIG. 5 is a flow diagram that shows an example process 500 for causing coverage data to be presented based at least in part on receiving input indicating a location of interest. As described above, in at least one example, a user interface (e.g., user interface 300) can be configured to present personalized coverage information to user(s) 106. In at least one example, the presentation module 128 can generate coverage maps corresponding to locations of interest to a user(s) 106.

Block 502 illustrates identifying a location of interest to a user 106. In some examples, the presentation module 128 can determine a location of a device 108 associated with a user 106 based at least in part on location data received from a location device associated with the device 108. In such examples, the presentation module 128 can determine the location of the device 108 to be the location of interest.

In other examples, the presentation module 128 can receive input indicating a location of interest to a user 106. As described above, in at least one example, a user interface (e.g., user interface 300) can include a search bar. The search bar can enable user(s) 106 to input locations where he or she is interested in accessing coverage data. The user 106 can actuate a control to initiate the search (e.g., request coverage data for the area associated with the search query). Based at least in part on receiving the search query, the presentation module 128 can determine the location associated with the search query to be the location of interest. In additional and/or alternative examples, a user 106 can interact with a location on a coverage map without inputting an address into the search bar. For instance, a user 106 can touch, click, or otherwise select a region on the coverage map as his or her location of interest. Based at least in part on receiving the user input, the presentation module 128 can determine the location associated with the user input to be the location of interest.

Block 504 illustrates determining an area corresponding to the location of interest. Based at least in part on determining a location of interest associated with a user 106, the presentation module 128 can determine the area corresponding to the location of interest. In such examples, the presentation module 128 can perform pairwise comparisons between predetermined areas and the location of interest. In at least one example, the presentation module 128 can select the area closest to the location of interest as the area corresponding to the location of interest. The area closest to the location of interest can be within a threshold distance of the location of interest. The presentation module 128 can leverage additional and/or alternative methods for determining the area corresponding to the location of interest.

Block 506 illustrates accessing coverage data corresponding to the area. In at least one example, the presentation module 128 can access coverage data associated with the area. In at least one example, the coverage data can be mapped to, or otherwise associated with, the area in the database 130.

Block 508 illustrates presenting coverage data corresponding to the location of interest via a coverage map. In at least one example, the presentation module 128 can access the coverage data and present the coverage data corresponding to the location of interest via the coverage map. In at least one example, a graphical element (e.g., graphical element 314) can represent a location of interest on a coverage map (e.g., coverage map 302). The graphical element can be a pin, a flag, a callout box, etc. Additionally, the presentation module 128 can generate an interface element (e.g., interface element 316) that conveys the coverage data associated with the area to the user 106. In at least one example, the interface element can include textual elements, graphical elements, etc. to convey coverage data to the user 106.

In some examples, the presentation module 128 can access coverage data associated with areas around the area associated with the location of interest. As such, a coverage map can provide coverage data for a location around the location of interest. The presentation module 128 can cause a coverage map associated with a general location around the location of interest to be presented via a device 108 associated with a user 106. In some examples, the coverage map can include additional details such as locations of retail stores associated with the service provider, etc.

In at least one example, a coverage map can be specific to a particular service provider (e.g., service provider 102). In some examples, the presentation module 128 can determine which service provider a device 108 is associated with and can access coverage data associated with the corresponding service provider to present via the coverage map. In other examples, the presentation module 128 can receive input indicating a particular service provider. In such examples, the presentation module 128 can access coverage data associated with the particular service provider to present via the coverage map.

In additional and/or alternative examples, a coverage map can show an accurate and detailed comparison of coverage that is available via various service providers, as described above. In such examples, users can compare the coverage offered by each of the service providers to determine which service provider offers the best coverage in a particular location—based at least in part on user data collected from devices that have connected to the service provider by the network. Additionally and/or alternatively, a coverage map can be associated with a single service provider and a user interface can be configured to present two or more coverage maps in the user interface. In such examples, the two or more coverage maps can be displayed in a side-by-side arrangement to enable users to compare coverage associated with the two or more service providers corresponding to the two or more coverage maps, as described above.

In additional and/or alternative examples, the presentation module 128 can leverage the coverage data to generate user interfaces that are configured to present coverage information to user(s) 106 in a way other than a coverage map. For instance, the presentation module 128 can generate user interfaces that depict graphs, tables, charts, etc. Additionally and/or alternatively, the presentation module 128 can leverage the coverage data to generate user interfaces that convey rankings between service providers, advantages of subscribing to one service provider over another service provider, etc.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
memory that stores one or more modules that are executable by the one or more processors to cause the system to perform operations comprising:
receiving user data from a plurality of devices associated with one or more telecommunications service providers, the user data including a plurality of logs corresponding to activities between individual devices of the plurality of devices and the one or more telecommunications service providers;
accessing a subset of logs of the plurality of logs that correspond to an area having a predetermined size, wherein the subset of logs comprises:
(i) a first number of positive logs, a positive log of the positive logs representing a successful connection between a first device of the plurality of devices and a telecommunications service provider of the one or more telecommunications service providers via a level of technology that is available in the area and for the device; and
(ii) a second number of negative logs, a negative log of the negative logs representing a successful connection between a second device of the plurality of devices and the telecommunications service provider via either one of (a) a lower level of technology than the level of technology available in the area and for the device or (b) a no service signal;
determining that the first number of positive logs meets or exceeds a threshold number;
determining that the first number of positive logs is greater than the second number of negative logs;
determining that the area is associated with verified coverage based on (i) the first number of positive logs meeting or exceeding the threshold number and (ii) the first number being greater than the second number;
determining coverage data associated with the area, at least a portion of the coverage data indicating (i) that coverage associated with the area is verified coverage and (ii) a data speed associated with the area;
generating, based at least in part on the coverage data, a user interface to graphically represent the coverage in the area via a coverage map; and
causing the user interface to be presented via a third device of the plurality of devices.

2. The system as claim 1 recites, wherein:
each log of the plurality of logs corresponds to an activity;
the activity is associated with at least one of date/time data, device data, network data, location data, signal strength data, throughput data, voice data, or video data; and
the operations further comprise determining the coverage data based at least in part on at least one of the date/time data, the device data, the network data, the location data, the signal strength data, the throughput data, the voice data, or the video data.

3. The system as claim 1 recites, the operations further comprising:
filtering a log out of the subset of logs to generate a refined subset of logs based at least in part on:
determining that a location accuracy associated with location data corresponding to the log is above a threshold location accuracy;
determining that a signal strength corresponding to the log is outside of a range of signal strengths; or
determining that a timestamp corresponding to the log is associated with a time outside of a specified period of time; and
determining the coverage data based at least in part on the refined subset of logs.

4. The system as claim 1 recites, wherein the coverage data further indicates at least one of technology levels available for the area or a signal strength associated with the area.

5. The system as claim 4 recites, the operations further comprising determining the technology levels available for the area based at least in part on individual technology levels associated with individual logs of the subset of logs.

6. The system as claim 4 recites, the operations further comprising determining the signal strength associated with the area based at least in part on averaging individual signal strengths associated with individual logs of the subset of logs.

7. The system as claim 1 recites, the operations further comprising determining the data speed associated with the area based at least in part on averaging individual data transfer speeds associated with individual logs of the subset of logs.

8. A computer-implemented method comprising:
determining, by one or more servers associated with a telecommunications service provider, aggregated data associated with connection efforts of a plurality of devices;
determining, by the one or more servers, a first number of successful connection efforts wherein individual devices of the plurality of devices successfully established connections with the telecommunications service provider via a technology level available in a first area and for the device, the first area corresponding to a geographical location;

determining, by the one or more servers, a second number of successfully established connections with the telecommunications service provider via a lower technology level than what is available in the first area and for the device;

determining, by the one or more servers, that coverage associated with the first area is verified based at least in part on:
   (i) determining that the first number is above a threshold number in the first area; and
   (ii) determining, by the one or more servers, that the first number is greater than the second number in the first area;

determining, by the one or more servers, first coverage data indicating that coverage associated with the first area is verified coverage; and generating, by the one or more servers and based at least in part on the first coverage data, a user interface to graphically represent the coverage in the first area via a first coverage map based at least in part on including a graphical element corresponding to the first area indicating that the coverage associated with the first area is verified coverage.

9. The computer-implemented method as claim 8 recites, further comprising:
determining second coverage data associated with a second area corresponding to the geographical location, the second coverage data indicating that coverage associated with the second area is not verified coverage; and
generating the user interface to graphically represent the coverage in the second area via the first coverage map based at least in part on excluding the graphical element corresponding to the second area indicating that the coverage associated with the second area is not verified coverage.

10. The computer-implemented method as claim 9 recites, wherein the first area and the second area are a same predetermined size.

11. The computer-implemented method as claim 8 recites, wherein the aggregated data comprises a plurality of logs, and the computer-implemented method further comprises:
determining a subset of logs of the plurality of logs that correspond to the first area;
determining a technology level available for the first area based at least in part on the level of technology associated with an individual log of the subset of logs; and
adding an interface element to the user interface to present the technology level with the first coverage map.

12. The computer-implemented method as claim 8 recites, wherein the aggregated data comprises a plurality of logs, and the computer-implemented method further comprises:
determining a subset of logs of the plurality of logs that correspond to the first area;
determining a signal strength associated with the first area based at least in part on averaging individual signal strengths associated with individual logs of the subset of logs; and
adding an interface element to the user interface to present the signal strength via the first coverage map.

13. The computer-implemented method as claim 8 recites, wherein the aggregated data comprises a plurality of logs, and the computer-implemented method further comprises:
determining a subset of logs of the plurality of logs that correspond to the first area;
determining a data speed associated with the first area based at least in part on averaging individual data transfer speeds associated with individual logs of the subset of logs; and
adding an interface element to the user interface to present the data speed via the first coverage map.

14. The computer-implemented method as claim 8 recites, further comprising:
determining a location of interest based at least in part on input provided via a user device associated with a user;
determining that the first area corresponds to the location of interest;
adding an interface element to the user interface to identify the location of interest on the first coverage map; and
presenting the first coverage data for the location of interest via a popup on the user interface, the user interface being presented via the user device associated with the user.

15. The computer-implemented method as claim 8 recites, further comprising:
generating the user interface to graphically represent coverage via a second coverage map associated with the first area, the second coverage map corresponding to a second service provider; and
arranging the first coverage map and the second coverage map on the user interface in a side-by-side arrangement.

16. A non-transitory computer-readable medium storing computer-executable instructions that, when executed, cause one or more processors to perform acts comprising:
determining aggregated data associated with connection efforts of a plurality of devices;
determining a first number of successful connection efforts wherein individual devices of the plurality of devices successfully established connections with a telecommunications service provider via a technology level available in a first area and for the device, the area being one of a plurality of areas corresponding to a geographical location;
determining a second number of successfully established connections with the telecommunications service provider via a lower technology level than what is available in the area and for the device;
determining that coverage associated with the area is verified based at least in part on:
   (i) determining that the first number is above a threshold number in the area; and
   (ii) determining that the first number is greater than the second number in the area;
determining, based at least in part on determining that the coverage associated with the area is verified, coverage data associated with the plurality of areas; and
generating, based at least in part on the coverage data, a user interface to graphically represent the coverage in the geographical location via a coverage map including a plurality of tiles respectively corresponding to the plurality of areas, each tile of the plurality of tiles being associated with a presentation indicating whether coverage associated with a corresponding area is verified coverage.

17. The non-transitory computer-readable medium as claim 16 recites, the acts further comprising:
for an area of the plurality of areas, determining at least one of a highest technology level available for the area or a signal strength associated with the area; and causing an interface element to be presented via the user interface in association with the tile corresponding to the area, the interface element conveying at least one of the highest technology level or the signal strength.

18. The non-transitory computer-readable medium as claim 16 recites, the acts further comprising:

determining, based at least in part on determining that the coverage associated with a corresponding area is verified coverage, a data speed associated with the area based at least in part on averaging data transfer speeds associated with the area for a period of time; and causing an interface element to be presented via the user interface in association with the tile corresponding to the area, the interface element conveying the data speed.

19. The system as claim 1 recites, wherein determining that the coverage associated with the area is verified coverage is further based at least in part on determining:

a portion of the first number of positive logs are associated with a signal strength above a threshold signal strength; and determining that the portion of the first number of positive logs associated with the signal strength above the threshold signal strength is above a threshold.

20. The system as claim 1 recites, wherein the level of technology is a highest level of technology available in the area and for the device.

* * * * *